United States Patent [19]

Vogel

[11] 4,073,091
[45] Feb. 14, 1978

[54] FOLDABLE PLANT SUPPORT

[76] Inventor: James P. Vogel, 430 - 6 St., SW., Wells, Minn. 56097

[21] Appl. No.: 697,393

[22] Filed: June 18, 1976

[51] Int. Cl.² .............................................. A01G 17/06
[52] U.S. Cl. ......................................... 47/45; 211/206
[58] Field of Search ............... 47/44, 45, 47; 211/178; 248/166

[56] References Cited

U.S. PATENT DOCUMENTS

| 374,906 | 12/1887 | Rovane | 47/47 |
| 3,113,400 | 12/1963 | Emond | 47/45 |
| 3,559,339 | 2/1971 | Worley | 47/45 |

Primary Examiner—Robert E. Bagwill

[57] ABSTRACT

A foldable plant support is disclosed comprising a first frame and a second opposed frame, each frame having vertical legs with support members on the legs for receiving support bars that span the vertical legs of each frame and support bars that span the distance between the first frame and the second frame. The support bars that span the distance between the first frame and the second frame are hingedly secured to the first frame and the second frame through eyelets at the ends of the support bars, the eyelets having an opening sufficiently wide in diameter so that when the frame is folded over on itself, the various support bars can move with respect to the first and second frame without bending.

1 Claim, 4 Drawing Figures

FOLDABLE PLANT SUPPORT

SUMMARY OF THE INVENTION

The present invention relates to a foldable plant support comprising a first frame consisting of a pair of first opposed vertical stakes joined at the top thereof by a first connecting bar transverse to the first vertical stakes, a plurality of first horizontally opposed support members being provided on the first vertical stakes. A second frame is provided comprising a pair of opposed second vertical stakes joined at the top thereof by a second connecting bar transverse to said second vertical stakes, a plurality of second horizontal opposed support members on said vertical stake. The second support members on the second vertical stakes match the first support members on the first vertical stakes and further the first support members on the first vertical stakes and the second support members on the second vertical stakes are horizontally opposed to one another. A plurality of first horizontal bars are attached to horizontally span the first vertical stakes and are supported on the first vertical stakes by said first support members. A plurality of second horizontal bars are attached to horizontally span the second vertical stakes and are supported on the second vertical stakes by the second support members. A plurality of third horizontal bars are pivotally attached to and horizontally span the first vertical stakes and the second vertical stakes through hinge members on the ends of the third horizontal bars, the hinge members allowing for the folding of the first and second frames over on one another, the third horizontal bars also being supported on the first and second vertical stakes by said first and second support members.

In a further embodiment, the first and second support members could comprise lateral walls projecting transversely from the longitudinal axes respectively of the first and second vertical stakes.

The first vertical stakes, the second vertical stakes, the first connecting bars and the second connecting bars as well as the first horizontal bars, the second horizontal bars and the third horizontal bars comprise semi-rigid self-supporting members and the lateral walls comprise crimps in the first vertical stakes and the second vertical stakes. The hinge on the ends of the third horizontal bars in this embodiment comprises eyelets, the opening of which are greater in diameter than the first and second vertical stakes and the lateral walls are equal to or greater in length than the diameter of the eyelets.

The aforementioned arrangement allows for the first and second frames to be folded over on one another without causing the bending or other deformity of the third horizontal bars, the opening in the eyelets being great enough to take up the slack created when the frame is folded over on itself to lie in a substantially flat position.

DETAILED DESCRIPTION OF THE PREFERRED EMBODIMENT

Figure 1:
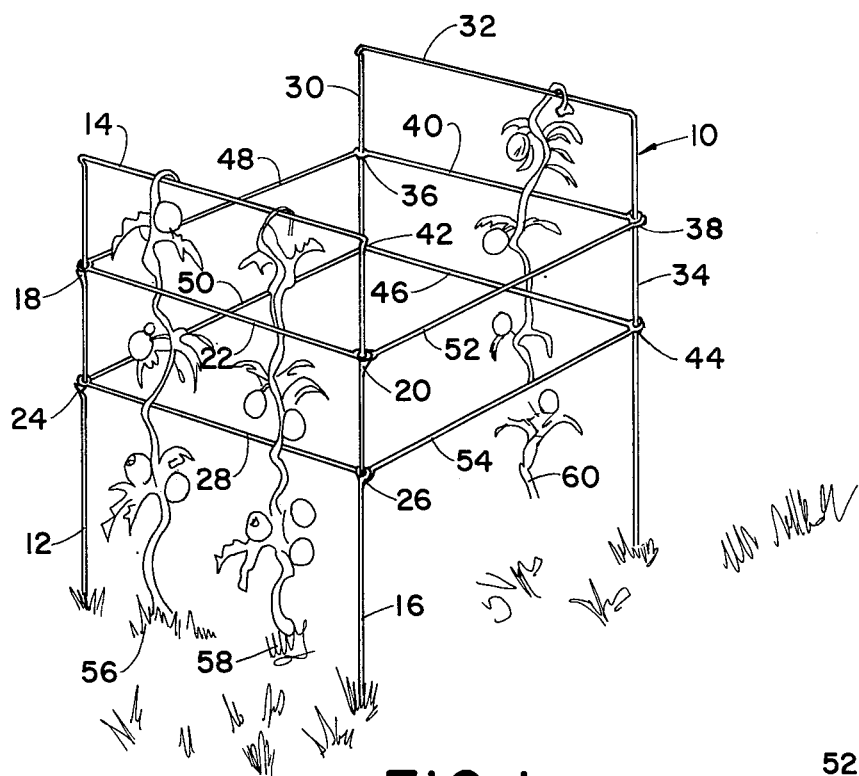
FIG. 1 comprises a perspective view illustrating the foldable plant support according to one embodiment of the present invention, FIG. 2 comprises a front elevation of the first frame member of a foldable plant support and illustrates the various horizontally opposed support members thereon formed by crimping the vertical stakes of the first frame, the horizontally opposed support members being used to support various horizontal support bars, FIG. 3 comprises a perspective view in section of a horizontal support bar having a hinge at the end comprising an eyelet, the opening of which is of a greater diameter than the vertical stake on which it is mounted in order to facilitate the folding of the plant support in on itself and to allow the horizontal bar to take up any slack during the folded configuration of the foldable plant support, and FIG. 4 comprises a perspective view of a foldable plant support in a folded position.
Figure 2:
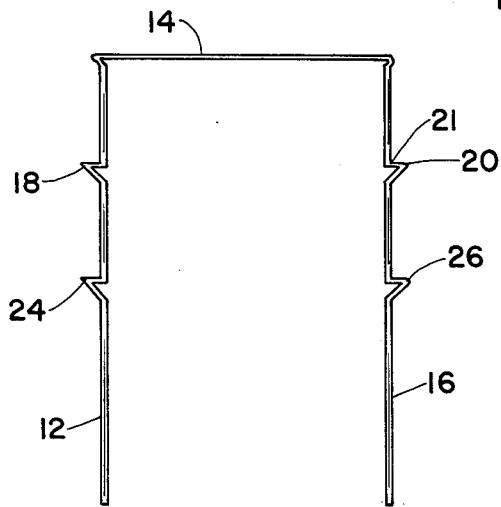
Figure 3:
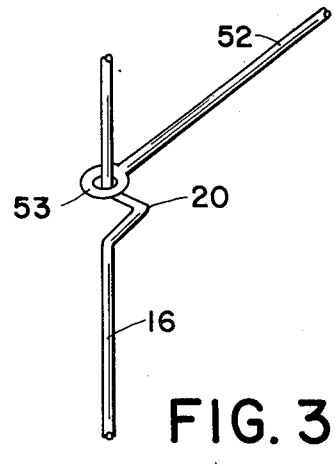

Plant supports are disclosed in the prior art U.S. Pat. Nos. 3,793,771 Slaughter; 3,731,429 Orthman; 3,174,255 Knell; 3,004,366 Jaspert, Jr.; 1,976,094 Ritchie; 1,617,494 Nuckols; 1,361,464 Hunt and 1,324,237 Eue. The reference to Slaughter, and Hunt disclose folding plant apparatus; however, the Slaughter reference lacks sufficient supporting members between the opposable frames for preventing the opposable frames from collapsing in on one another under a full plant load, whereas the Hunt patent comprises a triangular arrangement of the upright support stakes which cannot be folded over on one another without the additional step of removing various pivot pins in the hinges used to interconnect the triangular configuration of upright stakes.

It is therefore an object of the present invention to overcome these and other difficulties encountered in the prior art.

It is a further object of the present invention to provide a novel foldable plant support in which the horizontal support members interconnecting opposed frames are sufficient to prevent the opposed frames from collapsing in on one another.

It is a further object of the present invention to provide a foldable plant support that is not triangular in configuration and does not require the removal of various hinge pins in order to collapse or fold the frame over on itself for easy storage.

It is also an object of the present invention to provide a rectangular foldable plant support which may be folded over on itself in a substantially flat configuration, the various horizontal supporting bars being hingedly secured to opposable frames in a fashion such that the hinges are self-compensating to take up any slack or expansion of the various opposed frame members when they are folded over on one another in a substantially flat vertical position.

These and other objects have been achieved according to the present invention and will become apparent from the disclosure and claims that follow as well as the appended drawing.

Referring to the drawing, a foldable plant support 10 is illustrated comprising a first frame having vertical stakes 12 and 16 connected at the top thereof by means of a transverse connecting member 14 and various support members 18 and 20 and 24 and 26 which are formed by crimping the legs 12 and 16 at appropriate places along the lengths thereof.

Figure 4:
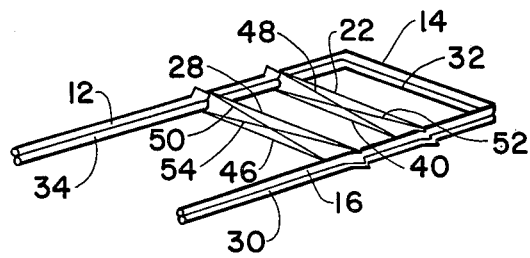

Similarly an opposed frame comprising vertical legs 30 and 34 connected at the top thereof by means of a transverse bar 32 are provided, this frame having support members 36 and 38 and 42 and 44 which are horizontally opposed to the support members 18 and 20 and 24 and 26 respectively. The support members 18 and 20 are used to receive and support a horizontal bar 22 having looped ends which fit around the vertical stakes 12 and 16 and similarly support members 24 and 26 suport a horizontal bar 28 also having looped ends for fitting around the stakes 12 and 16. The opposed frame has horizontal bars 40 and 46 respectively supported by support members 36, 38 and 42, 44 on stakes 34 and 30. A third set of horizontal bars are also supported by the support members on the opposed frames the third horizontal bars comprising bars 52 and 54 supported respectively by support members 20 and 38 and 26 and 44 whereas third horizontal support bars 48 and 50 are respectively supported by support members 18 and 36 and 24 and 42. The ends of these third horizontal support bars comprise hinges for hingedly securing these third horizontal bars to the opposed vertical frames, the hinges comprising in a preferred embodiment loops at the ends of the horizontal bars such as an eyelet 53 at the end of horizontal bar 52, the eyelet 53 having an opening the diameter of which is substantially greater than the leg or vertical support 16, the support member 20 comprising a vertical wall such as wall 21 which is greater in length than the diameter the opening in eyelet 53. This arrangement allows the third horizontal support member, such as support member 52, 54, 48 and 50 to move laterally when the foldable plant support is folded over on itself such as is illustrated in FIG. 4 wherein the leg 30 is moved inwardly towards the leg 16 and the legs 12 and 34 are moved outwardly away from leg 16 to join one another in a substantially flat position as illustrated in FIG. 4. The lateral movement of the third horizontal bars 48, 50, 52 and 54 achieved through the hinges and especially the eyelets at the ends thereof allows for the foldable plant support 10 to be collapsed over on itself as is illustrated in FIG. 4 in which the plant support 10 is in a substantially flat folded position.

In use, the plant support 10 is unfolded to provide a rectlinear configuration as illustrated in FIG. 1 and the vertical stakes 12 and 16 of the first opposable frame and the vertical stakes 30 and 34 of the second opposable frame are inserted in the ground after which plants such as tomato plants 56, 58 and 60 are planted as illustrated in FIG. 1 after which they are trained as they grow to be supported by the various cross members 28, 22 and 14 as well as the cross members 46, 40 and 32 of the second opposable frame. Additionally, the plurality of third support members 48, 50, 52 and 54 are not only used to provide supports for plants such as tomato plants or other vegetation which may be trained thereover to form a plant tent, but also to prevent the opposable frames as previously defined from collapsing in on one another and provide rigid support and separation of these opposable frames.

Although the invention has been described by reference to some embodiments, it is not intended that the novel foldable plant support be limited thereby but that modifications thereof are intended to be included as falling within the broad scope and spirit of the foregoing disclosure, the following claims and the appended drawing.

I claim:
1. A foldable plant support comprising
   (a) a first frame consisting of a pair of opposed first vertical stakes joined at the top thereof by a first connecting bar transverse to said first vertical stakes, a plurality of horizontally opposed first crimp support means extending into lateral walls transversely from the longitudinal axis of said first vertical stakes;
   (b) a second frame consisting of a pair of opposed second vertical stakes joined at the top thereof by a second connecting bar transverse to said second vertical stakes, a plurality of second horizontally opposed crimp support means extending into lateral walls transversely from the longitudinal axis of said second vertical stakes matching said first horizontally opposed support means on said first frame, said first horizontally opposed support means on said first vertical stakes being horizontally opposed to said second horizontally opposed support means on said second frame;
   (c) a plurality of first horizontal bar means attached to horizontally span said first vertical stakes and supported thereon through looped ends by said first crimp support means;
   (d) a plurality of second horizontal bar means attached to horizontally span said second vertical stakes and supported thereon by said second crimp support means;
   (e) a plurality of third horizontal bars pivotally attached to and horizontally spanning said first vertical stakes and said second vertical stakes through eyelet hinge means on the ends of said third horizontal bars for folding said first frame and said second frames over on one another, the opening in each of said eyelets being greater in diameter than the diameter of the vertical stakes around which it is positioned and said lateral walls are equal to or greater in length than the diameter of said eyelets, said openings in said eyelets also being great enough to take up the slack created where said first vertical stakes and said second vertical stakes are folded over on one another so that said plant support will be substantially flat when so folded, said third horizontal bars being supported on said first vertical stakes and said second vertical stakes by said first support means and said second support means.

* * * * *